United States Patent [19]

Belyayev

[11] Patent Number: 5,749,960
[45] Date of Patent: May 12, 1998

[54] FORMULATION FOR PRODUCING HEAT INSULATING MATERIAL AND METHOD FOR PRODUCING THE SAME

[75] Inventor: Vladimir Petrovich Belyayev, Moscow, Russian Federation

[73] Assignee: Radva Corporation, Radford, Va.

[21] Appl. No.: 821,094

[22] Filed: Mar. 20, 1997

[51] Int. Cl.⁶ .................................................... E04B 1/74
[52] U.S. Cl. .............................. 106/600; 106/632; 252/62
[58] Field of Search ............................ 252/62; 106/600, 106/632, 38.27, 38.3

[56] References Cited

U.S. PATENT DOCUMENTS

| | | |
|---|---|---|
| 3,669,299 | 6/1972 | Jones et al. |
| 4,001,126 | 1/1977 | Marion et al. |
| 4,110,499 | 8/1978 | Harrison |
| 4,171,985 | 10/1979 | Motoki et al. |
| 4,462,835 | 7/1984 | Car |
| 4,946,811 | 8/1990 | Tuovinen et al. |
| 5,015,606 | 5/1991 | Lang et al. |
| 5,312,806 | 5/1994 | Mogensen |

FOREIGN PATENT DOCUMENTS 2060239  5/1996  Russian Federation

*Primary Examiner*—Paul Marcantoni
*Attorney, Agent, or Firm*—J. Michael Martinez de Andino; McGuire, Woods, Battle & Boothe LLP

[57] ABSTRACT

A formulation for producing a heat insulating material and the method for making the same that uses an exothermic reaction and which depends on sodium silicate, sodium hydroxide, firing clay and iron silicon. The iron silicon reacts in the alkaline medium in an exothermic reaction that results in a high release of heat. As a result of the exothermic reaction, the formulation heats up to temperatures near 100° C. The formulation then starts to harden. The evolved water steam and hydrogen form pores, which allows for an increase of many times the volume of the resulting heat insulating material. The self-heating reaction causes the formulation to lose water, which leads to an increase in the dielectric qualities of the material. Additionally, the iron silicon raises the heat resistance of the resulting heat insulating material.

17 Claims, No Drawings

_5,749,960_

1

FORMULATION FOR PRODUCING HEAT INSULATING MATERIAL AND METHOD FOR PRODUCING THE SAME

I. RELATED APPLICATION

This application is related to the Russian Federation Patent No.2060239, which issued to Vladimir Petrovich Belyayev, the Applicant herein, on May 20, 1996 for a Compound for Producing Heat Insulation Material.

II. TECHNICAL FIELD

In general, the present invention relates to the field of heat insulating materials and, more precisely, to a formulation for producing a heat insulating material that can withstand a broad range of temperatures and which is formed through an exothermic reaction that is initiated at normal room temperature conditions or at lower temperatures, and even in cold temperatures without requiring a heating source.

III. BACKGROUND OF THE INVENTION

There are well known means for producing heat insulating materials for a variety of purposes or equipment. Such means sometimes require the use of an external heat source. The resulting heat insulating material is therefore not formed during normal room conditions. This significant shortcoming does not allow for the production of heat insulating material in large-dimensional constructed forms. Additionally, the currently known heat insulating materials often do not have a resistance to heat that exceeds 900° C., which consequently narrows the potential range of their application.

For example, U.S. Pat. No. 4,110,499 discloses a heat protective material that requires the material to be subjected to temperatures in the range of 2000° F. to 2500° F. in order to obtain maximum strength. U.S. Pat. No. 5,015,606 discloses a lightweight ceramic material for building purposes that is produced by firing a foamed mixture at temperatures above 600° C. Further, U.S. Pat. No. 5,312,806 discloses mineral fibers that are for use in thermal insulation, which is made through a process that requires a coke-heated cupola furnace that operates at temperatures in the range of 1565° C. to 1605° C. When the production of heat insulating material requires the use of an external heat source, the process for such production leads to a significant increase in the heat insulating material's costs.

Moreover, there are currently known heat insulating materials that use iron silicon and which may need to have heat firing during the production of the heat insulation materials. For example, a known means for making highly porous items for heat insulating equipment, consists of the use of a mixture into which a finely milled metallic silicon or iron silicon is introduced with a finely dispersed material, such as diatomite, trepel or marshalite. A liquid glass is then added in the amount necessary for turning the mixture into a thick creamy consistency. The mixture is then thoroughly mixed and heated, causing the iron silicon or silicon to react in the alkaline medium of liquid glass.

For example, U.S. Pat. No. 4,171,985 discloses the use of iron silicon with liquid glass in the temperature range from 5° to 90° C. in which the unaided reaction may take 24 hours to come to completion, so that heating to 90° C. is suggested "as a matter of course". The problem with this above-described process is that the chemical reaction which produces the heat insulating material either does not start at all without heating or requires a long time to come to completion without heating. Additionally, when heat is required for the chemical reaction, the hardening of the mixture occurs during post-reaction cooling. This limits the applicability of such a mixture or process in large-dimensioned constructed forms because of associated dimensional changes. Further, the process described in the 985 Patent requires the use of the water-soluble alkali silicate, alumina cement, a metal base foaming agent and a foam stabilizing agent to produce its heat insulating material. The use of these four elements limit the applicability of the heat insulating material production during field conditions and in construction forms of large dimensions that do not have an external heat source.

In order to overcome the above-mentioned defects in the previously mentioned means for producing heat insulating materials for various purposes, there is a need for a formulation for producing a heat insulating material and a method for making the same that includes a self-starting chemical reaction that leads to a dimensionally stable product and which initiates at normal room temperatures or at lower temperatures down to −10° C. There is also a need for a formulation for producing a heat insulating material and the method for making the same that eliminates the need for external heating or firing. There is also a need for a formulation for producing a heat insulating material and the method for producing the same that broadens the range for the utilization of the heat insulating material. Further, there is a need for a formulation for producing a heat insulating material and the method for producing the same that given its low density still increases the hardness characteristics of the heat insulating material, which allows for the application as a heat insulating construction material. Additionally, there is a need for a formulation for producing a heat insulating material and the method for producing the same that improves the process for making the material, as well as lowering the material costs and provides for the use of a material possessing adhesive and cohesive properties. Furthermore, there is a need for a formulation for producing a heat insulating material and the method for producing the same that allows for the production of heat resistant and heat insulating materials with dielectric properties that work in conditions of normal, low and high temperatures.

The formulation for producing a heat insulating material and the method for making the same of the present invention meeting these requirements are described in more detail below.

IV. SUMMARY OF THE INVENTION

In accordance with the present invention, the disadvantages of the prior heat insulating materials and methods for making the same have been overcome. The formulation for producing a heat insulating material and the method for making the same of the present invention allows a manufacturer of heat insulating materials to reduce the costs of production while providing for a heat insulating material that has a broad temperature range of use, can be used as a heat insulating construction material, has a high affinity for various fillers and which includes a self-starting hardening process that initiates at normal room and colder temperatures.

According to the present invention, the formulation for producing the heat insulating material and the method for making the same consist of using liquid glass, iron silicon, sodium hydroxide and firing clay in the following percentages: liquid glass 32–52%; sodium hydroxide 3–4%; firing clay 25–36%; and iron silicon 20–22%. Accordingly, it is the primary object of the present invention to provide a formulation for producing a heat insulating material and the method for making the same that eliminates the need for the use of external heating or firing. It is an additional object of this invention to provide a formulation for producing a heat insulating material and the method for making the same that has a broad temperature range of use and which can be used as a heat insulating construction material. It is another object of this invention to provide for a formulation for producing a heat insulating material and the method for making the same that has a high affinity for various fillers and a self-starting hardening process that occurs at normal room or lower temperatures. It is still another object of this invention to provide for a formulation for producing a heat insulating material and the method for making the same that reduces the costs of production. It is a further object of this invention to provide for a formulation for producing a heat insulating material and the method for making the same that has structural properties which are useful for building purposes.

Other objects and advantages of this invention will become apparent from the following description wherein are set forth, by way of illustration and example, certain embodiments of this invention.

V. NO DRAWINGS

VI. DETAILED DESCRIPTION OF THE PREFERRED EMBODIMENTS

Before the present invention is described, however, it is to be understood that this invention is not limited to a particular or specific description. It is also to be understood that the terminology used herein is for the purpose of describing particular embodiments only, and is not intended to be limiting, as the scope of the present invention will be limited only by the appended claims. Further, unless defined otherwise, all terms used herein have the same meaning as commonly understood by one of ordinary skill in the art to which this invention belongs.

Referring now to the present invention for a formulation for producing a heat insulating material and the method for making the same, the invention is directed toward a heat insulating material that is made by mixing an iron/silicon alloy with water glass (sodium silicate, which is the same as "liquid glass"), thereby providing the necessary water for the reaction. The reaction follows a path similar to that of the well-known alkaline corrosion of iron in water to produce hydrated ferric oxide and hydrogen. The evolution of water resulting from the solvent evaporation aids in the formation of a material with structural integrity.

Additionally, firing clay can act as a binder, which, together with dehydrated sodium silicate, forms a typical two or three dimensional matrix of $SiO_3$ tetrahedra, which likely contributes to the heat insulating material's physical strength. The key is in the initial reaction of iron/silicon alloy with water in an alkaline medium. The significant difference over the prior art is that, with the present invention, the reaction initiation is spontaneous and immediate when the ingredients are mixed and the reaction is completed in a relatively short time. In addition, other improvements over the prior art include (1) a moldable heat insulating material that is stable when exposed to high temperatures and is based on inorganic materials; (2) a heat insulating material that is made from a formulation that uses sodium silicate and produces a foam without the use of an anionic surfactant or chromium or aluminum; and (3) a heat insulating material that does not require the use of high temperature firing or pressure molding.

The formulation of the present invention for producing a heat insulating material and the method for making same uses an exothermic reaction which depends on sodium silicate or liquid glass, sodium hydroxide, iron silicon and a filler, such as firing clay. More specifically, iron silicon reacts in an exothermic reaction in an alkaline medium resulting in a rapid release of energy in the form of heat. As a result of the exothermic reaction, the mixed formulation self-heats to temperatures near 100° C. The formulation becomes porous as a result of the formation of water vapor and hydrogen, and hardens as a result of water loss. Pore formation results in an increase of many times the volume and lowers the density of the resulting heat insulating material. The loss of water, in addition to contributing to pore formation, also leads to an increase in the dielectric qualities of the material. Additionally, the reaction of the iron component in iron silicon contributes to the heat resistance of the resulting heat insulating material.

The presence of sodium hydroxide is necessary for the reaction of the formulation that results in the heat insulating material and makes it possible for the reaction to occur at normal room temperature or at temperatures down to −10° C. Sodium hydroxide contributes to the speed with which the reaction occurs, thus insuring an adequate temperature rise and the evolution of water which results in pore formation. The increased temperature also facilitates water loss, thus contributing to the hardening of the heat insulating material.

The firing clay in the formulation provides for the necessary consistency (viscosity) of the initial mixture, and contributes to the heat resistance of the heat insulating material. Other materials, such as kaolin or other finely dispersed powders, which perform analogous functions in providing viscosity and heat resistance, may be used instead of firing clay.

The ratio of $SiO_2$ to $Na_2O$ (modulus) for the sodium silicate or liquid glass is in the approximate range of 2.4 to 3.0, given the density of 1.41 to 1.47 g/cm$^3$. The values of the dispersion of the iron silicon are determined by the specific area of 0.004 to 0.005 cm$^2$/g, which allows for varying the viscosity of the formulation and its reactivity.

The formulation for producing the heat insulating material having the qualities described above is prepared using the following steps:

(a) Granules of sodium hydroxide are added to the liquid glass and the solution is agitated to ensure complete dissolution. The iron silicon and the firing clay are added.

(b) The mixture is again agitated until a homogeneous plastic consistency is achieved and is then poured into a form or mold.

(c) The resulting heat insulating material expands and hardens under normal conditions within 1 to 1.5 hours, substantially filling up the volume of the form or mold. Further, in the process of hardening, hydrogen is produced, and during the final stage of hardening, water vapor is evolved as the product temperature rises to near 100° C. as a result of the reaction exothermicity. Depending on the construction forms or molds and the intended use, the heat insulating material may be used as a prepared block as removed from the form or mold, or it may be used together with other construction forms.

The qualities of the heat insulating material of the present invention based on the proposed formulation are compared below against a prior art prototype that also produces a heat insulating material. The prior art prototype has the following components listed as a percentage of total mass: liquid glass 90-95% and iron silicon having a particle size of 0.063 to 0.025 mm 5-10%. The comparisons of some proposed formulations of the present invention to the prior art prototype are described in the following Table 1.

TABLE 1

| Component | Proposed Compound Percentage - Mass % of the Present Invention's Heat Insulating Material | | | | |
|---|---|---|---|---|---|
| | A | B | C | D | Prototype |
| Liquid Glass | 55 | 52 | 32 | 3 | 90 |
| Sodium Hydroxide | 1.5 | 3 | 4 | 3 | — |
| Firing Clay | 25.5 | 25 | 36 | 37 | — |
| Iron Silicon | 18 | 20 | 28 | 30 | 10 |
| Resulting Parameters | | | | | |
| Density-Kg/m$^3$ | 280 | 110 | 260 | 320 | 120 |
| Limit of Hardness under Compression - MGa | 0.01 | 0.4 | 1.21 | 1.32 | 0.2 |
| Heat Transfer Coefficient - Wt/m. °C. | 0.41 | 0.05 | 0.11 | 0.12 | 0.06 |
| Volume Multiple | 1.5 | 8.0 | 8.0 | 4.5 | 7.0 |
| Time of Hardening - Min. | 720 | 90 | 100 | 95 | — |
| Working Temperature Range of the Resulting Heat Insulating Material - °C. | −200° to 1100° | | | | Range of 900 |

A significant shortcoming of the prior art prototype is that it requires an external heat source having a temperature in the order of 400°–500° C. in order to produce the heat insulating material. Further, the iron silicon in the prior art prototype does not react as fast and does not produce a heat insulating material having acceptable structural qualities. The prior art prototype produces a heat insulating material using the conventional method that requires firing.

In contrast, the proposed formulations of the present invention do not require the use of an external heat source. Indeed, the proposed formulations have a self-starting process that occurs in natural conditions at normal room temperatures, and even in lower temperatures down to −10° C. Further, the resulting heat insulating material of the present invention has a working temperature range of from about −200° C. to about 1100° C. Additionally, Table 1 shows that the prior art prototype does not have a hardening process. As previously discussed, the prior art prototype does not have an exothermic reaction (no self-heating).

In comparison, Table 1 shows four proposed formulations of the present invention for producing a heat insulating material. The proposed formulation D exceeds the desired percentages of the components of the formulation in that the iron silicon content is too high, such that the density of its resulting heat insulating material is higher than desired in most cases. The proposed formulations A, B, and C, however, do produce a heat insulating material that meets the objectives of the present invention, and are a vast improvement over the prior art prototype.

In Table 2 shown below, examples of different fillers/binders are identified for use in the proposed formulation of the present invention in which part of the firing clay is replaced with the proposed filler. In this manner, the proposed formulation may be used with various fillers as a means for producing materials having the desired physical-mechanical properties.

TABLE 2

| Compound - Binder | Component Mass % |
|---|---|
| Liquid Glass | −52 |
| Sodium Hydroxide | 4 |
| Firing Clay | 16 |
| Iron Silicon | 28 |

| | Filler/Binder = 3/1 | |
|---|---|---|
| Parameter | Sand/Binder | Ceramic/Binder |
| Density - Kg/m$^3$ | 1750 | 760 |
| Limit of Hardness under Compression - MGa | 37.4 | 5.32 |
| Heat Transfer Coefficient - Wt/m. °C. | 0.85 | 0.54 |
| Time of Hardening - Min. | 120 | 120 |
| Working Temperature Range - °C. | 1400 | 1100 |

Possible Reactions in Formation of Insulating Material

The possible reactions in the formulation of the present invention for the heat insulating material are:

$$Fe+2H_2O \rightarrow Fe(OH)_2+H_2 \text{(alkaline medium)} \quad 1.$$

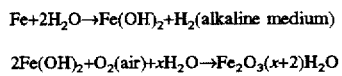

Reactions 1 and 2 represent a normal oxidation process which will be more rapid in the presence of finely divided iron. The reaction is exothermic. Mixing FeSi with a few drops of 0.5M NaOH produces rapid warming, indicating that reaction 1 is indeed proceeding. Since the entire process is carried out "in the open", air is surely present to supply oxygen for reaction 2. The expected water of hydration will be lost as the temperature of the mixture increases.

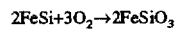

Reaction 3 is one of the possible reactions in slag formation and may indeed occur here. Normally one would expect this silicate formation to occur at higher temperatures such as might be found in steel making ovens. The extent to which this reaction occurs will reduce the observed weight loss in the thermo-gravimetric analysis by reducing the extent of involvement of reaction 1 and by adding weight through oxygen incorporation. It is unlikely that reaction 3 occurs to any significant extent given the weight loss result reported below.

Isothermal (28° C.) thermo-gravimetric analysis of the entire system as supplied, resulted in a weight loss of 13.9%. The sodium silicate used is a 42° Beaumé product containing 29.6% SiO$_2$ and 9.20% Na$_2$O and therefore 61.2% water. On total material composition, this amounts to 23.2% water. Taking the composition of FeSi into account (approximately 25% Fe and 75% Si), the weight loss due to hydrogen evolution (reaction 1) is expected to be 0.27%. The weight gain due to oxidation (reactions 1 plus 2) amounts to 3.7%. Thus, the theoretical weight loss is expected to be 19.8%. In a second thermo-gravimetric analysis performed on the reaction product and carried out in stepped temperature mode, an additional weight loss of 4.9% on total reaction charge was measured giving a total weight loss of 18.8%, which compares not unreasonably with the theoretical.

SUMMARY

The proposed formulation for producing a heat insulating material has a self-starting exothermic chemical reaction which hardens the heat insulating material. The chemical reaction can occur at normal room temperatures or even at temperatures down to −10° C. The proposed formulation includes liquid glass and iron silicon. The proposed formulation differs from other known prototypes or methods for making heat insulating material in that the proposed formulation does not use an external heat source and it contains sodium hydroxide and firing clay. The percentages of the components of the proposed formulation are:

| | |
|---|---|
| liquid glass | 32–52% |
| sodium hydroxide | 3–4% |
| firing clay | 25–36% |
| iron silicon | 20–22% |

It is understood that while certain forms of this invention have been illustrated and described, the invention is not limited thereto, except in so far as such limitations are included in the following claims.

What is claimed and described to be secured by Letters Patent is as follows:

1. A heat insulating material formed by mixing ingredients comprising:
    a) water glass 35–52% by weight
    b) sodium hydroxide 3–4% by weight
    c) filler 25–36% by weight; and
    d) iron silicon 20–22% by weight.

2. The heat insulating material of claim 1, wherein said heat insulating material is formed with said ingredients at room temperature.

3. The heat insulating material of claim 1, wherein said heat insulating material is formed with said ingredients at temperatures down to approximately −10° C.

4. The heat insulating material of claim 1, wherein said heat insulating material is formed through an exothermic reaction that produces a formulation which hardens without the use of an external energy source.

5. The heat insulating material of claim 4, wherein said formulation is placed in a mold and upon hardening substantially fills up the volume of said mold.

6. The heat insulating material of claim 1, wherein said filler is firing clay.

7. A heat insulating material that is formed by mixing ingredients at room temperature, said ingredients comprising:
    a) water glass 35–52% by weight
    b) sodium hydroxide 3–4% by weight
    c) filler 25–36% by weight; and
    d) iron silicon 20–22% by weight.

8. The heat insulating material of claim 7, wherein said heat insulating material is formed with said ingredients at temperatures down to approximately −10° C.

9. The heat insulating material of claim 7, wherein said heat insulating material produces an exothermic reaction and a resulting formulation that hardens without the use of an external energy source.

10. The heat insulating material of claim 9, wherein said formulation is placed in a mold and upon hardening substantially fills up the volume of the mold.

11. The heat insulating material as in claim 7, wherein said filler is firing clay.

12. A heat insulating material that is formed by mixing ingredients at temperatures down to −10° C., said ingredients comprising:
    a) water glass 35–52% by weight
    b) sodium hydroxide 3–4% by weight
    c) filler 25–36% by weight; and
    d) iron silicon 20–22% by weight.

13. The heat insulating material of claim 12, wherein said heat insulating material produces an exothermic reaction and a resulting formulation that hardens in 1 to 1.5 hours.

14. The heat insulating material of claim 12, wherein said water glass has a $SiO_2/Na_2O$ ratio (modulus) that is within the approximate range 2.4 to 3.0 with a density of approximately 1.41 to 1.47 g/cm$^3$.

15. The heat insulating material of claim 12, wherein materials such as kaolin or other finely divided powders may be used in place of said firing clay.

16. The heat insulating material of claim 13, wherein said formulation is placed in a mold and upon hardening substantially fills up the volume of said mold.

17. The heat insulating material of claim 12, wherein said water glass is sodium silicate.

* * * * *